US008839450B2

(12) United States Patent
Durham et al.

(10) Patent No.: US 8,839,450 B2
(45) Date of Patent: Sep. 16, 2014

(54) SECURE VAULT SERVICE FOR SOFTWARE COMPONENTS WITHIN AN EXECUTION ENVIRONMENT

(75) Inventors: David Durham, Beaverton, OR (US); Hormuzd Khosravi, Portland, OR (US); Uri Blumenthal, Fair Lawn, NJ (US); Men Long, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1181 days.

(21) Appl. No.: 11/833,073

(22) Filed: Aug. 2, 2007

(65) Prior Publication Data
US 2009/0038017 A1  Feb. 5, 2009

(51) Int. Cl.
*G06F 12/14* (2006.01)
*G06F 17/30* (2006.01)

(52) U.S. Cl.
USPC ................. 726/27; 713/193; 713/194; 726/2

(58) Field of Classification Search
None
See application file for complete search history.

(56) References Cited

U.S. PATENT DOCUMENTS

| 5,301,287 A | 4/1994 | Herrell et al. |
|---|---|---|
| 5,312,673 A | 5/1994 | Dressler |
| 5,379,400 A | 1/1995 | Barakat et al. |
| 5,619,723 A | 4/1997 | Jones et al. |
| 5,634,043 A | 5/1997 | Self et al. |
| 5,687,370 A | 11/1997 | Garst et al. |
| 5,751,989 A | 5/1998 | Harrison |
| 5,926,549 A | 7/1999 | Pinkas |
| 5,944,821 A | 8/1999 | Angelo |
| 5,966,531 A | 10/1999 | Skeen et al. |
| 5,987,557 A | 11/1999 | Ebrahim |
| 5,991,881 A | 11/1999 | Conklin et al. |
| 6,105,137 A | 8/2000 | Graunke et al. |
| 6,163,834 A | 12/2000 | Garcia et al. |
| 6,321,276 B1 | 11/2001 | Forin |
| 6,487,643 B1 | 11/2002 | Khare et al. |
| 6,496,847 B1 | 12/2002 | Bugnion et al. |
| 6,542,919 B1 | 4/2003 | Wendorf et al. |
| 6,553,438 B1 | 4/2003 | Coffman et al. |
| 6,567,897 B2 | 5/2003 | Lee et al. |
| 6,571,333 B1 | 5/2003 | Jain et al. |

(Continued)

FOREIGN PATENT DOCUMENTS

WO   98/47072 A1   10/1998
WO   01/42874 A2   6/2001

OTHER PUBLICATIONS

"Bus", A Word Definition From the Webopedia Computer Dictionary, Retrieved on May 7, 2012, pp. 1-2. Available at: http://www.webopedia.com/TERM/B/bus.html.

(Continued)

*Primary Examiner* — Fatoumata Traore
(74) *Attorney, Agent, or Firm* — Garrett IP, LLC (57) ABSTRACT

Embodiments of apparatuses, articles, methods, and systems for secure vault service for software components within an execution environment are generally described herein. An embodiment includes the ability for a Virtual Machine Monitor, Operating System Monitor, or other underlying platform capability to restrict memory regions for access only by specifically authenticated, authorized and verified software components, even when part of an otherwise compromised operating system environment. The underlying platform to lock and unlock secrets on behalf of the authenticated/authorized/verified software component provided in protected memory regions only accessible to the authenticated/authorized/verified software component. Other embodiments may be described and claimed.

24 Claims, 6 Drawing Sheets

(56) References Cited

U.S. PATENT DOCUMENTS

| | | | |
|---|---|---|---|
| 6,658,515 B1 | 12/2003 | Larson et al. | |
| 6,671,791 B1 | 12/2003 | McGrath | |
| 6,684,305 B1 | 1/2004 | Deneau | |
| 6,738,882 B1 | 5/2004 | Gau | |
| 6,751,720 B2 | 6/2004 | Barroso et al. | |
| 6,751,737 B1 | 6/2004 | Russell et al. | |
| 6,760,787 B2 | 7/2004 | Forin | |
| 6,823,433 B1 | 11/2004 | Barnes et al. | |
| 6,832,257 B1 | 12/2004 | Gamo | |
| 6,931,540 B1 | 8/2005 | Edwards et al. | |
| 6,941,458 B1* | 9/2005 | Ellison et al. | 713/164 |
| 6,957,199 B1 | 10/2005 | Fisher | |
| 6,961,852 B2 | 11/2005 | Craft | |
| 6,996,551 B2 | 2/2006 | Hellerstein et al. | |
| 6,996,710 B1 | 2/2006 | Ellison et al. | |
| 7,010,630 B2 | 3/2006 | Pagan | |
| 7,013,481 B1 | 3/2006 | Ellison et al. | |
| 7,028,229 B2 | 4/2006 | McGuire et al. | |
| 7,082,615 B1* | 7/2006 | Ellison et al. | 726/26 |
| 7,093,295 B1 | 8/2006 | Saito | |
| 7,103,779 B2 | 9/2006 | Kiehtreiber et al. | |
| 7,194,634 B2 | 3/2007 | Ellison et al. | |
| 7,225,325 B2 | 5/2007 | Rhoades | |
| 7,328,453 B2 | 2/2008 | Merkle, Jr. et al. | |
| 7,350,072 B2 | 3/2008 | Zimmer et al. | |
| 7,409,472 B2 | 8/2008 | Iwatani et al. | |
| 7,467,370 B2 | 12/2008 | Proudler et al. | |
| 7,478,394 B1 | 1/2009 | de Dinechin et al. | |
| 7,506,122 B1 | 3/2009 | Agesen et al. | |
| 7,542,026 B2 | 6/2009 | Pagan | |
| 7,558,966 B2 | 7/2009 | Durham et al. | |
| 7,581,256 B2 | 8/2009 | Cockerille et al. | |
| 7,587,612 B2 | 9/2009 | Savagaonkar et al. | |
| 7,594,124 B2 | 9/2009 | Durham et al. | |
| 7,603,484 B2 | 10/2009 | Dai et al. | |
| 7,653,727 B2 | 1/2010 | Durham et al. | |
| 7,669,242 B2 | 2/2010 | Sahita et al. | |
| 7,734,926 B2* | 6/2010 | Morais | 713/181 |
| 7,739,517 B2 | 6/2010 | Sahita et al. | |
| 7,761,674 B2 | 7/2010 | Durham et al. | |
| 7,953,980 B2 | 5/2011 | Schluessler et al. | |
| 8,132,003 B2 | 3/2012 | Durham et al. | |
| 2001/0002882 A1 | 6/2001 | Shimazaki et al. | |
| 2001/0014157 A1 | 8/2001 | Hashimoto et al. | |
| 2002/0013889 A1 | 1/2002 | Schuster et al. | |
| 2002/0029308 A1 | 3/2002 | Babaian et al. | |
| 2002/0082824 A1* | 6/2002 | Neiger et al. | 704/2 |
| 2002/0120871 A1 | 8/2002 | Watkins et al. | |
| 2002/0129212 A1 | 9/2002 | Lee et al. | |
| 2003/0005239 A1 | 1/2003 | Dover | |
| 2003/0005272 A1 | 1/2003 | Nalawadi et al. | |
| 2003/0037237 A1 | 2/2003 | Abgrall et al. | |
| 2003/0061540 A1 | 3/2003 | Lee et al. | |
| 2003/0097496 A1 | 5/2003 | Gabryjelski | |
| 2003/0097579 A1* | 5/2003 | England et al. | 713/193 |
| 2003/0135685 A1 | 7/2003 | Cowan | |
| 2003/0159055 A1 | 8/2003 | Robbins et al. | |
| 2003/0217250 A1 | 11/2003 | Bennett et al. | |
| 2003/0229794 A1 | 12/2003 | Sutton et al. | |
| 2003/0229808 A1 | 12/2003 | Heintz et al. | |
| 2003/0235310 A1 | 12/2003 | Saito et al. | |
| 2004/0030911 A1 | 2/2004 | Isozaki et al. | |
| 2004/0039924 A1 | 2/2004 | Baldwin et al. | |
| 2004/0044872 A1 | 3/2004 | Scott | |
| 2004/0153998 A1 | 8/2004 | McGuire et al. | |
| 2004/0221200 A1 | 11/2004 | Armstrong et al. | |
| 2004/0226009 A1 | 11/2004 | Mese et al. | |
| 2004/0268013 A1 | 12/2004 | Pagan | |
| 2005/0027988 A1* | 2/2005 | Bodrov | 713/176 |
| 2005/0060568 A1 | 3/2005 | Beresnevichiene et al. | |
| 2005/0081199 A1 | 4/2005 | Traut | |
| 2005/0132122 A1* | 6/2005 | Rozas | 711/100 |
| 2005/0138417 A1 | 6/2005 | McNerney et al. | |
| 2005/0188198 A1* | 8/2005 | Ellison et al. | 713/164 |
| 2005/0198051 A1 | 9/2005 | Marr et al. | |
| 2005/0213768 A1 | 9/2005 | Durham et al. | |
| 2005/0216577 A1 | 9/2005 | Durham et al. | |
| 2005/0223220 A1 | 10/2005 | Campbell et al. | |
| 2005/0223221 A1 | 10/2005 | Proudler et al. | |
| 2005/0251857 A1 | 11/2005 | Schunter et al. | |
| 2005/0278499 A1 | 12/2005 | Durham et al. | |
| 2005/0278563 A1 | 12/2005 | Durham et al. | |
| 2005/0289311 A1 | 12/2005 | Durham et al. | |
| 2005/0289542 A1 | 12/2005 | Uhlig et al. | |
| 2006/0004944 A1* | 1/2006 | Vij et al. | 711/6 |
| 2006/0026569 A1 | 2/2006 | Oerting et al. | |
| 2006/0047972 A1* | 3/2006 | Morais | 713/190 |
| 2006/0156398 A1 | 7/2006 | Ross et al. | |
| 2006/0161761 A1 | 7/2006 | Schwartz et al. | |
| 2006/0236125 A1 | 10/2006 | Sahita et al. | |
| 2006/0236127 A1* | 10/2006 | Kurien et al. | 713/193 |
| 2006/0259734 A1 | 11/2006 | Sheu et al. | |
| 2006/0294596 A1 | 12/2006 | Govindarajan et al. | |
| 2007/0005935 A1 | 1/2007 | Khosravi et al. | |
| 2007/0005957 A1 | 1/2007 | Sahita et al. | |
| 2007/0005992 A1 | 1/2007 | Schluessler et al. | |
| 2007/0006175 A1 | 1/2007 | Durham et al. | |
| 2007/0006307 A1 | 1/2007 | Hahn et al. | |
| 2007/0156999 A1 | 7/2007 | Durham et al. | |
| 2008/0077767 A1 | 3/2008 | Khosravi et al. | |
| 2009/0172814 A1 | 7/2009 | Khosravi et al. | |
| 2011/0231668 A1 | 9/2011 | Schluessler et al. | |
| 2012/0226903 A1 | 9/2012 | Durham et al. | |

OTHER PUBLICATIONS

"Direct Memory Access (DMA) Modes and Bus Mastering DMA", The PC Guide, Retrieved on May 7, 2012, pp. 1-3. Available at: http://www.pcguide.com/ref/hdd/if/ide/modesDMA-c.html.

"DMA", A Word Definition From the Webopedia Computer Dictionary, Retrieved on May 7, 2012, pp. 1-2. Available at: http://www.webopedia.com/TERM/D/DMA.html.

"Executable and Linkable Format (ELF)", TIS Committee, Tools Interface Standards (TIS), Portable Formats Specification, Version 1.1, Oct. 1993, 60 pages.

"Kernel", A Word Definition From the Webopedia Computer Dictionary, Retrieved on May 5, 2012, pp. 1-2. Available at: http://www.webopedia.com/TERM/K/kernel.html.

"Mac OS X ABI Mach-O File Format Reference", Apple Developer, Overview, Feb. 4, 2009, pp. 1-70.

"Microsoft Portable Executable and Common Object File Format Specification", Microsoft Corporation, Revision 6.0, Feb. 1999, 74 pages.

"Red Hat Enterprise Linux 4", Red Hat, Inc., Using as, the GNU Assembler, copyright 2003, 280 pages.

"Standardizing Out-of-Band Management Console Output and Terminal Emulation (VT-UTF8 and VT100+)", Windows Platform Design Notes, Designing Hardware for the Microsoft Windows Family of Operating Systems, Preview Draft Version 0.90, Oct. 24, 2001, pp. 1-15.

Collins, Robert R., "Intel's System Management Mode", System Management Mode Overview, Retrieved on May 5, 2012, pp. 1-4. Available at: http://www.rcollins.org/ddj/Jan97/Jan97.html.

Zhang, "Memory Management in JikesNode Operating System", A Thesis Submitted to the University of Manchester for the Degree of Master of Science in the Faculty of Science and Engineering, 2005, 1 page Available at: http://www.citeulike.org/user/robertburrelldonkin/article/6743255.

Duc, et al., "CryptoPage: an Efficient Secure Architecture with Memory Encryption, Integrity and Information Leakage Protection", 22nd Annual Applications Conference on Computer Security, ACSAC, Dec. 2006, 10 pages.

Grevstad, Eric, "CPU-Based Security: The NX Bit", Hardware Central, Windows XP SP2 Stars Amd Antivirus Feature, May 24, 2004, pp. 1-3.

Levy, et al, "Hiding Your Wares: Transparently Retrofitting Memory Confidentiality into Legacy Applications", IEEE International Conference on Communications on Jun. 24-28, 2007, pp. 1368-1372.

Markatos, et al, "User-Level DMA without Operating System Kernel Modification", IEEE 3rd International Symposium on High Performance Computer Architecture, Feb. 1-5, 1997, pp. 322-331.

(56) References Cited

OTHER PUBLICATIONS

International Preliminary Report on Patentability received for International Patent Application No. PCT/US2005/022577, issued on Jan. 9, 2007, 6 pages.
International Search Report and Written Opinion received for International Patent Application No. PCT/US2005/022577, mailed on Nov. 24, 2005, 8 pages.
Sheveley, "Enhanced Virtualization on Intel Architecture-Based Servers", Technology@Intel Magazine, Mar. 2005, pp. 1-9.
Uhlig, et al., "Intel Virtualization Technology", IEEE Computer Society, Cover Feature, May 2005, pp. 48-56.
Wagle, et al., "StackGuard: Simple Stack Smash Protection for GCC", Imunix, Inc., GCC Developers Summit 2003, Aug. 2001, pp. 243-256.
Yan, et al, "Improving Cost, Performance, and Security of Memory Encryption and Authentication", Proceedings of the 33rd International Symposium on Computer Architecture (ISCA-33), Jun. 2006, pp. 179-190.
Draheim, "AMD64/EM64T—The Coming Marker", Retrieved on Jul. 12, 2012, 4 pages. Available at: http://guidod.homelinux.org/article/em64t.print.html.

* cited by examiner

SECURE VAULT SERVICE FOR SOFTWARE COMPONENTS WITHIN AN EXECUTION ENVIRONMENT

CROSS-REFERENCE TO RELATED APPLICATIONS

This application is related to U.S. patent application Ser. No. 11/173,851, filed on Jun. 30, 2005 and titled "SIGNED MANIFEST FOR RUN-TIME VERIFICATION OF SOFTWARE PROGRAM IDENTITY AND INTEGRITY"; U.S. patent application Ser. No. 11/322,669, filed on Dec. 30, 2005 and titled "IDENTIFIER ASSOCIATED WITH MEMORY LOCATIONS FOR MANAGING MEMORY ACCESSES"; and U.S. patent application Ser. No. 11/395,488, filed on Mar. 30, 2006 and titled "INTRA-PARTITIONING OF SOFTWARE COMPONENTS WITHIN AN EXECUTION ENVIRONMENT", all of which are incorporated herein by reference.

BACKGROUND

Software programs are subject to complex and evolving attacks by malware seeking to gain control of computer systems. These attacks can take on a variety of different forms ranging from attempts to crash the software program to subversion of the program for alternate purposes. Additionally, it is particularly difficult to protect the run-time data of the program. The protection of this run-time data is especially important when it involves the program's secrets and configuration information or digital rights protection keying material needed by applications to protect content in main memory and while in transit.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present invention may provide a method, apparatus, and system for secure vault service for software components within an execution environment on a platform. In embodiments, secure vault service helps to protect data in memory during both run-time and while being stored offline from other applications and from other components (such as operating system components or the operating system itself).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
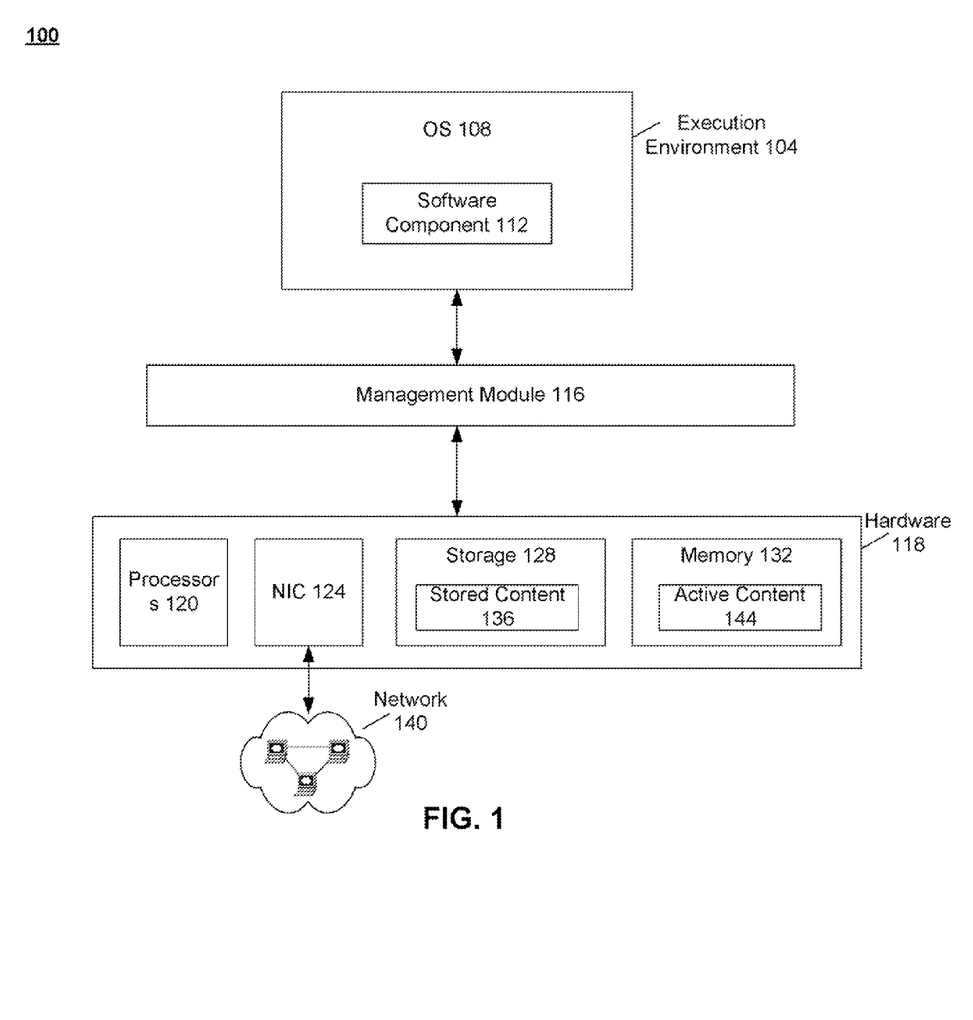
FIG. 1 illustrates a platform to provide secure vault service for software components within an execution environment, in accordance with an embodiment of the present invention.

FIG. 1 illustrates a platform 100 to provide for secure vault service for software components within an execution environment, in accordance with an embodiment of the present invention. The platform 100 may have an execution environment 104, which may be the domain of an executing operating system (OS) 108. The OS 108 may be a component configured to execute and control general operation of other components within the execution environment 104, such as the software component 112, subject to intra-partition memory access protections provided to selected components by an underlying management module 116, to be discussed in further detail below.

In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code). Alternatively, in embodiments, the component 112 may be an application process, thread, or other user space program, service or library.

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In addition to intra-partitioning selected components of the execution environment 104, the management module 116 may arbitrate general component access to hardware resources 118 such as one or more processor(s) 120, network interface controller (NIC) 124, storage 128, and/or memory 132.

The processor(s) 120 may execute programming instructions of components of the platform 100. The processor(s) 120 may be single and/or multiple-core processor(s), controller(s), application specific integrated circuit(s) (ASIC(s)), etc.

In an embodiment storage 128 may represent non-volatile storage to store persistent content to be used for the execution of the components on the platform 100, such as, but not limited to, operating system(s), program files, configuration files, etc. In an embodiment, storage 128 may include stored content 136, which may represent the persistent store of source content for the component 112. The persistent store of source content may include, e.g., executable code store that may have executable files and/or code segments, links to other routines (e.g., a call to a dynamic linked library (DLL)), a data segment, etc.

In various embodiments, storage 128 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 128 may be a storage resource physically part of the platform 100 or it may be accessible by, but not necessarily a part of, the platform 100. For example, the storage 128 may be accessed by the platform 100 over a network 140 via the network interface controller 124.

Upon a load request, e.g., from a loading component or agent of the OS 108, the management module 116 and/or the OS 108 may load the stored content 136 from storage 128 into memory 132 as active content 144 for operation of the component 112 in the execution environment 104.

In various embodiments, the memory 132 may be volatile storage to provide active content for operation of components on the platform 100. In various embodiments, the memory 132 may include RAM, dynamic RAM (DRAM), static RAM (SRAM), synchronous DRAM (SDRAM), dual-data rate RAM (DDRRAM), cache, etc.

In some embodiments, the memory 132 may organize content stored therein into a number of groups of memory locations. These organizational groups, which may be fixed and/or variable sized, may facilitate virtual memory management. The groups of memory locations may be pages, segments, or a combination thereof.

A virtual memory utilizing paging may facilitate the emulation of a large logical/linear address space with a smaller physical memory page. Therefore, the execution environment 104 may provide a virtual execution environment in which the components may operate, which may then be mapped into physical pages of the memory 132. Page tables maintained by the OS 108 and/or management module 116 may map the logical/linear addresses provided by components of the execution environment 104 to physical address of the memory 132. More details of the implementation of paging, and in particular paging with respect to intra-partitioning of components, may be given below in accordance with embodiments of this invention.

In various embodiments, the component 112, or portions thereof, may be selected for intra-partitioning to support secure vault services. Here, the management module 116 may identify and partition off portions of the component 112 to control access by the OS 108 or other components to the component 112. Partitioned portions may include any portion, up to all, of the particular component. A partitioned portion may be sequestered, either physically or virtually, from other components within the same execution environment, such that intra-execution environment accesses may be monitored and restricted, if necessary, by the underlying platform. Intra-partitioning may facilitate insulation of, e.g., component 112 from the OS 108, without requiring that the component 112 operate in an entirely separate execution environment, with a separate OS. Intra-partitioning may also afford the component 112 a level of protection from other components, even those of similar or higher privilege levels, within the execution environment 104 that may be compromised in some manner, e.g., by malware, rootkits, critical runtime failures, etc. Embodiments of this invention may provide for this protection and secure vault services while still allowing permitted interactions between the component 112 and other components, e.g., the OS 108, of the execution environment 104. Controlling access by the OS 108 to the component 112 may include various levels of access restrictions, as will be discussed below in further detail.

In various embodiments, intra-partitioning of components to support secure vault services within an execution environment may be useful in a platform having multiple, execution environments, such as virtual machines operating in a virtualization technology (VT) enabled platform. In such an embodiment, a management module may include, or be a part of, a virtual machine monitor (VMM).

Figure 2:
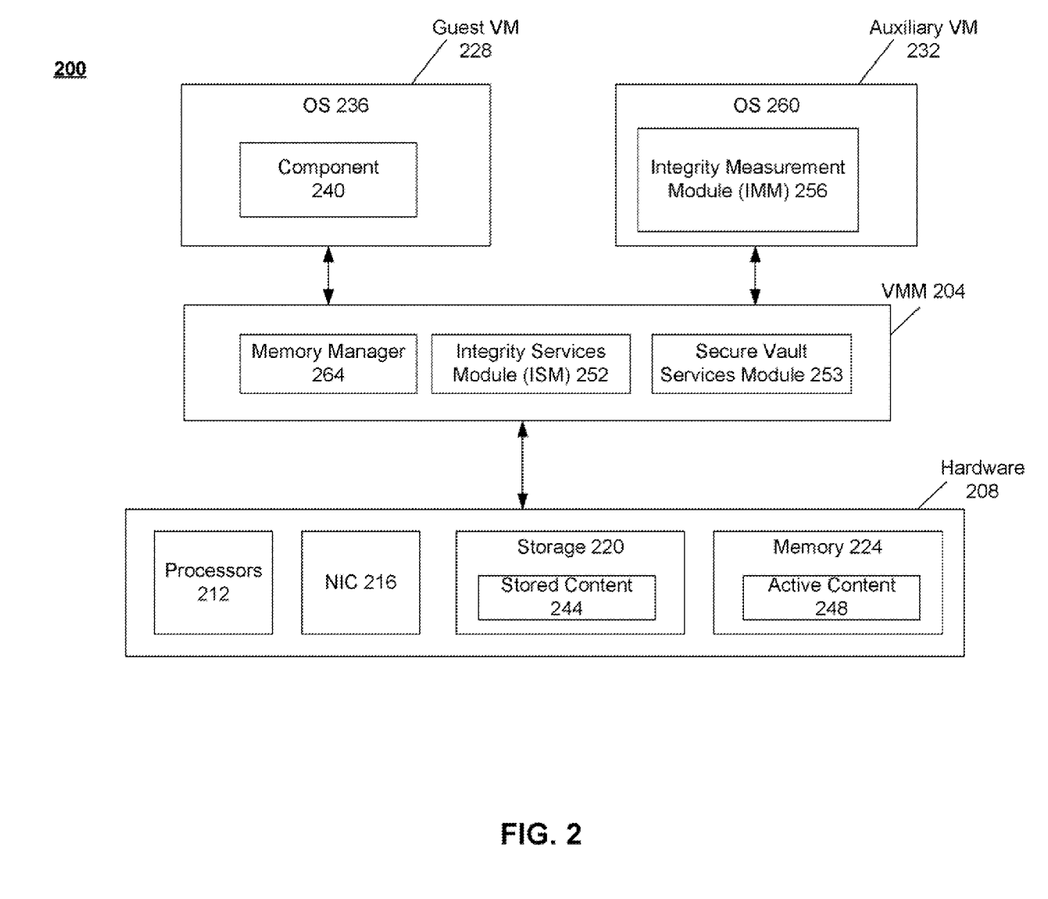
FIG. 2 illustrates a platform utilizing parallel execution environments, in accordance with an embodiment of the present invention.

FIG. 2 illustrates a platform 200 utilizing virtualization to provide parallel execution environments in accordance with an embodiment of this invention. In various embodiments, the platform 200 may be similar to, and substantially interchangeable with, the platform 100. Furthermore, elements described below may be similar to, and substantially interchangeable with, like-named elements described above, and vice versa.

In this embodiment a management module, e.g., virtual machine monitor (VMM) 204, on the platform 200 may present multiple abstractions and/or views of the platform hardware 208, e.g., one or more processor(s) 212, network interface controller (NIC) 216, storage 220, and/or memory 224, to the one or more independently operating execution environments, or "virtual machines (VMs)," e.g., guest VM 228 and auxiliary VM 232. The auxiliary VM 232 may be configured to execute code independently and securely isolated from the guest VM 228 and may prevent components of the guest VM 228 from performing operations that would alter, modify, read, or otherwise affect the components of the auxiliary VM 232. While the platform 200 shows two VMs, other embodiments may employ any number of VMs.

The components operating in the guest VM 228 and auxiliary VM 232 may each operate as if they were running on a dedicated computer rather than a virtual machine. That is, components operating in the guest VM 228 and auxiliary VM 232 may each expect to control various events and have complete access to hardware 208. The VMM 204 may manage VM access to the hardware 208. The VMM 204 may be implemented in software (e.g., as a stand-alone program and/ or a component of a host operating system), hardware, firmware, and/or any combination thereof.

The guest VM 228 may include an OS 236 and component 240. Upon a designated event, the VMM 204 may identify and partition off portions of the component 240 to control access to the partitioned portions by the OS 236 or other components. One or more of these partitioned portions may be used to represent a secure vault. In various embodiments, a designated event may be when stored content 244 is loaded from storage 220 to memory 224, as active content 248 or when the component 240 requests secure vault services. However, in various embodiments, other designated events may be additionally/alternatively used.

Figure 3:
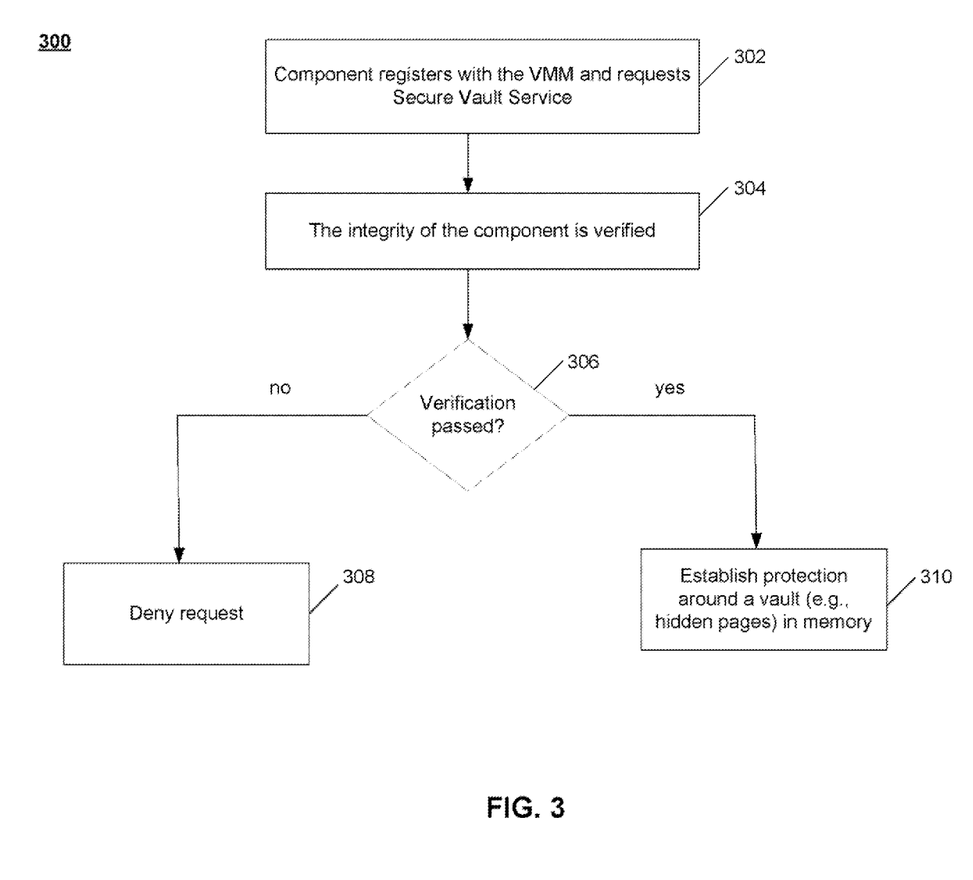
FIG. 3 illustrates operational phases of secure vault service for software components within an execution environment, in accordance with an embodiment of the present invention.

Intra-partition based protections to provide secure vault service may be provided to component 240 as described in FIG. 3 in accordance with an embodiment of this invention. Operational phases shown in FIG. 3 may be referenced by numerals within parentheses. Referring to FIG. 3, the component 240 may register with the VMM 204, and more particularly, with an integrity services module (ISM) 252 of the VMM 204 for protection (block 302). At this time, the component 240 may also request for secure vault services. In various embodiments, the registration may take place upon an occurrence of a registration event, e.g., loading of the active content 248 into memory 224, periodically, and/or in some other event-driven manner. In various embodiments, the registration may be initiated by the component 240, another component within the VM 228, e.g., the OS 236, the VMM 204, or a component of the VM 232.

Upon receiving the registration, the ISM 252 may cooperate with an integrity measurement module (IMM) 256 operating in the VM 232 to authenticate and verify the integrity of the component 240 (block 304). Authentication and verification of the integrity of the component 240 may help to prevent unauthorized modification and/or malicious termination, and may ensure that only recognized components may be afforded protection as defined by an administrator, user or other policy. The IMM 256 may operate in the VM domain 232 in the context of an OS 260, or in separate hardware and may, therefore, be largely independent of OS 236. By running outside of the context of the VM 228, the IMM 256 may have accurate and dependable memory measurement capabilities that may not be present, or possibly compromised, in the context of the OS 236.

The IMM 256 may provide the ISM 252 a response to the verification request such as pass, fail, pass w/qualification, fail w/qualification, etc. In various embodiments, qualifications may reflect degrees of integrity verification between pass and fail. The IMM 256 effectively identifies or authenticates the component and its data and assures that it is of the expected, correct form in memory.

In some embodiments, the active content 248 may include an integrity manifest, which may be a collection of information to be used in the verification of the integrity of the component 240. In various embodiments, the integrity manifest may include one or more integrity check values and/or relocation fix-up locations, covering the stored content 244, e.g., code store and/or static and/or configuration settings/data. The IMM 256 may access the integrity manifest from the active content 248 and verify that the component 240 corresponds, in total or in part, to the integrity manifest. The IMM 256 may verify the authenticity of the integrity manifest itself verifying a cryptographic signature over the integrity manifest structure to assure it is unaltered from its correct form. A comparison may be done of the images through, e.g., a byte-by-byte analysis or through analysis of cryptographic hashes.

In various embodiments, the IMM 256 may search for the active content 248 directly in the memory 224, e.g., through a direct memory access (DMA) or direct physical memory access. In various embodiments, the linear address of the component 240 may be provided to the IMM 256, e.g., through the ISM 252, and the IMM 256 may perform a virtual-to-physical mapping to identity the physical memory locations of the active content 248. In an embodiment, the VMM 204 may provide special interfaces to IMM 256 to provide access to active content 248.

In various embodiments, integrity measurement of the active content 248 may be conducted upon the initial registration, periodically, and/or in some other event-driven manner while the component 240 is executing (e.g., request for lock service or unlock service of the secure vault). Integrity measurement upon initial registration request or secure vault services request may help to determine that the initial state of the active content 248 and/or stored content 244 is as expected based on the state of the content at the time it was manufactured, or loaded last. The periodic or event-driven integrity measurements may help to detect attacks that inappropriately change the protected attributes of the active content 248 and/or stored content 244.

Further details of integrity measurements of components are described in U.S. patent application Ser. No. 11/173,851, filed Jun. 30, 2005, referred to and incorporated above.

The ISM 252 may receive a response from IMM 256 reflecting verification of integrity and location in memory of the active content 248 (block 306). If the verification fails, the ISM 252 denies the request and may trigger an alert (block 308). If the verification passes, the ISM 252 may cooperate with a memory manager 264 to intra-partition portions of the component 240 for secure vault services (block 310). Here, protection is established around a vault or hidden pages in memory so they may only be accessed by the verified component and/or around the entirety of the component itself.

While FIG. 2 illustrates execution environments being virtual partitions, other embodiments may provide different execution environments through other mechanisms, e.g., using a service processor, protected execution mode (such as System Management Mode SMM or Secure Execution Mode SMX, for example) and/or an embedded microcontroller. In various embodiments, an auxiliary environment may be partitioned from a host environment via a variety of different types of partitions, including a virtualized partition (e.g., a virtual machine in a Virtualization Technology (VT) scheme), as shown above, and/or an entirely separate hardware partition (e.g., utilizing Active Management Technologies (AMT), "Manageability Engine" (ME), Platform Resource Layer (PRL) using sequestered platform resources. System Management Mode (SMM), and/or other comparable or similar technologies). In various embodiments, a VT platform may also be used to implement AMT, ME, and PRL technologies.

Figure 4:
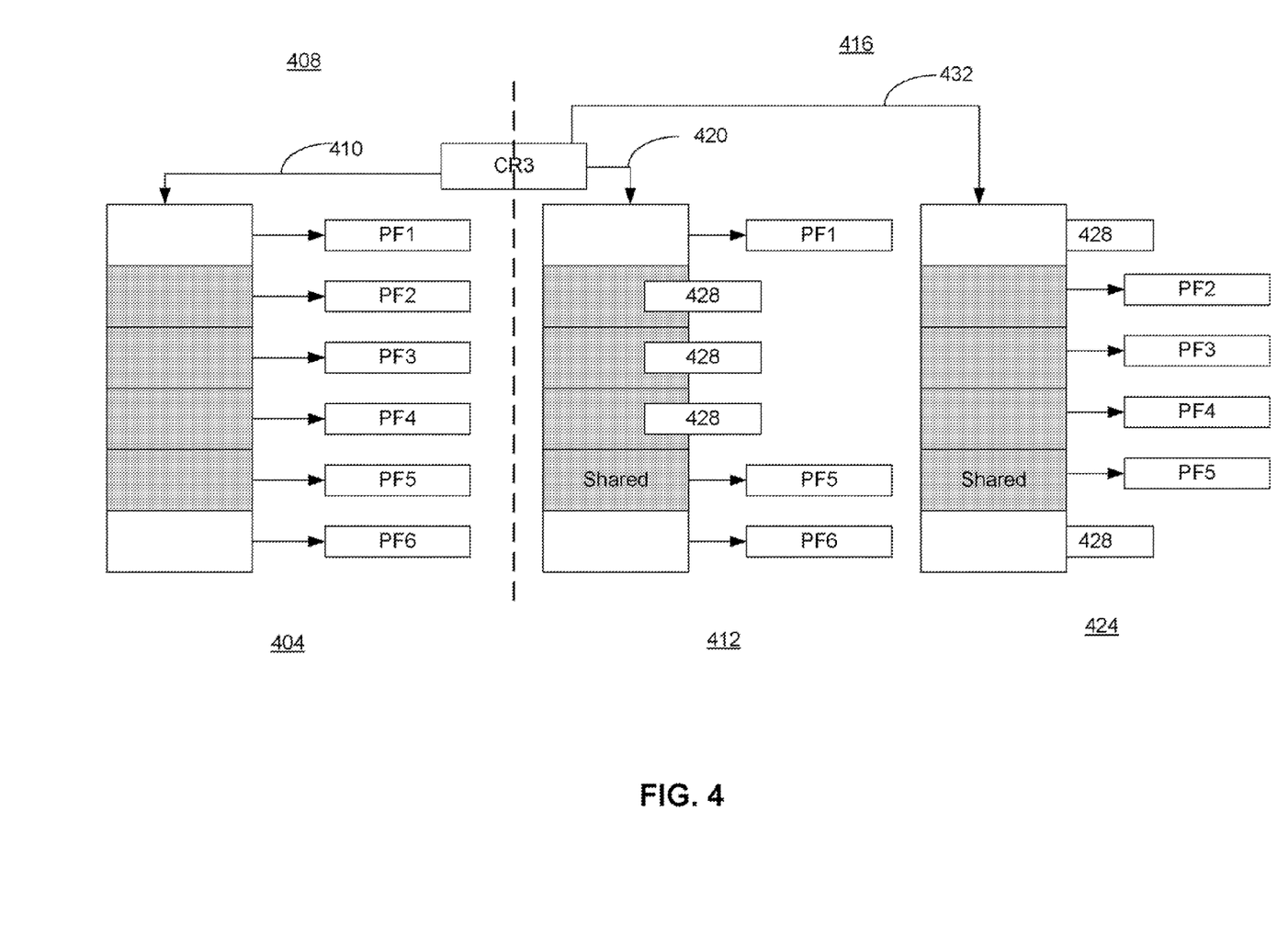
FIG. 4 illustrates intra-partitioning of portions of a component to provide secure vault service in accordance with an embodiment of the present invention.

FIG. 4 illustrates intra-partitioning of portions of the component 240 to support secure vault services in accordance with an embodiment of this invention. In this embodiment, the OS 236 may create a guest page table (GPT) 404 in an OS domain 408 mapping linear addresses of components executing in the VM 228 to physical addresses, or page frames. Component 240 may be set to occupy the $2^{nd}$ through $5^{th}$ page table entries (PTEs), which refer to page frames having active content 248, e.g., PF2-PF5. As is the case in VT platforms, the VMM 204 may monitor and trap register pointer (e.g., CR3) changes. When OS 236 creates GPT 404 and provides a CR3 value 410 pointing to the GPT 404, the VMM 204 may trap on the CR3 change, create an active page table (APT) 412 (which may be a duplicate or shadow copy of the GPT 404) in the VMM domain 416, and change the CR3 value 410 to value 420 pointing to the APT 412. In this way, the VMM 204 can coordinate accesses to the memory 224 from a number of VMs, e.g., VM 228 and VM 232.

In this embodiment, the VMM 204 may also create a protected page table (PPT) 424. The VMM 204 may copy the page frames having the active content 248, e.g., PF2-PF5, into the PPT 424 and assign the page table entries (PTEs) that do not refer to those page frames, e.g., $1^{st}$ PTE and $6^{st}$ PTE, with access characteristics 428 to cause a page fault upon execution. Similarly the APT page mappings for the active content (e.g. $2^{nd}$ through the $4^{th}$ PTE corresponding to PF2-PF4) will have access characteristics to cause a page fault on execution from the active (or OS's) domain. In various embodiments, the access characteristics 428 may be 'not present,' 'execute disabled,' and/or read-only. In an embodiment, the access characteristics 428 may be 'not present' or a combination of 'execute disable' and read-only to prevent unauthorized modifications to the active content 248 from the VM 228. In various embodiments, the setting of the access characteristics 428 may be done by the VMM 204, requested by the authenticated/verified component 240, the IMM 256, and/or by hardware.

The VMM 204 may assign the PTEs of the APT 412 that refer to page frames having partitioned portions of the component 240, e.g., $2^{nd}$ PTE-$4^{th}$ PTE, with access characteristics 428. It may be noted that some page frames, e.g., PF5, may be shared between the partitioned and non-partitioned elements. Therefore, in an embodiment the $5^{th}$ PTE may not have access characteristics 428 set in either APT 412 or PPT 424.

In this embodiment, execution flow between the APT 412 and PPT 424 may be managed as follows. Initially, CR3 may have value 420 pointing to APT 412 representing the execution of the guest operating system. An execution instruction pointer (EIP) may start with the $1^{st}$ PTE of the APT 412 and, upon an attempted access of the $2^{nd}$ PTE, may cause a page fault due to the access characteristics 428. The VMM 204 may take control, and change CR3 from value 420 to value 432, pointing to the PPT 424. The EIP may resume operation at the $2^{nd}$ PTE of the PPT 424, which may be a partitioned element. The EIP may execute through the $3^{rd}$ PTE, the $4^{th}$ PTE and the $5^{th}$ PTE. When the EIP attempts to access the $6^{th}$ PTE, the access characteristics 428 may cause another page fault and the VMM 204 may switch the CR3 back to value 420, for access to the $6^{th}$ PTE from the APT 412.

In some embodiments, the VMM 204 may monitor the execution flow between the APT 412 and PPT 424 to verify that the points the EIP enters and/or exits the PPT 424 are as expected according to the integrity manifest for the component 240 or other policy. Verification that the EIP jumps into the PPT 424 at valid entry points and/or jumps out of the PPT 424 at valid exit points, could facilitate a determination that the component 240 and/or other components in the VM 228 are operating correctly. If the entry/exit point is not as expected, the VMM 204 may determine that the access attempt to the partitioned component 240 is unauthorized and may raise an exception, which in various embodiments could include rejecting the attempted access, redirecting the access attempt to a different or NULL memory region, reporting the rejected access attempt to the OS 236 (for example, by injecting an invalid instruction exception), triggering an interrupt, notifying a separate VM, sending a network notification, and/ or causing a halt of the OS 236 as controlled by the VMM).

In various embodiments, the valid entry and/or exit points may be predetermined, e.g., at the time the component 240 is compiled, and/or may be dynamic. A dynamic entry and/or exit point may be created, e.g., when an interrupt occurs. For example, an interrupt may occur when the EIP is at the $3^{rd}$ PTE of the PPT 424, the VMM 204 may gain control, verify that the interrupt is authentic, and record the EIP value, processor register values, and call stack information for use as a dynamic exit point. The dynamic exit point may then serve as a valid entry point upon reentry to the partitioned elements of the PPT 424. Note that sensitive data in processor registers and the call stack may be stored as part of the dynamic exit point by the VMM 204 and cleaned/deleted before turning control back to the OS via the interrupt handler. This sensitive data may be restored by the VMM 204 when the corresponding dynamic entry point is executed on returning from the interrupt.

Additionally, in some embodiments an execution state (e.g., a stack state and/or a processor state, e.g., register values) may be recorded at an exit and verified upon reentry. This may provide some assurance that an unauthorized alteration/ modification did not occur.

In some embodiments data for an execution state verification may include a copy of the entire state or an integrity check value (ICV) calculation. An ICV may be calculated on, for example, the in parameters of a stack frame by setting the out parameters to default values. Likewise, an ICV may be calculated on the out parameters by setting the in parameters to default values.

If the entry/exit point and/or the execution state verification fail the VMM 204 may issue an exception to the access attempt.

Furthermore, in some embodiments, the VMM 204 may verify that the element calling the partitioned elements (e.g., secure vault or hidden pages), e.g., PF2-PF4, is permitted to access them. For example, the VMM 204 may receive a request from a component to access the partitioned elements. The VMM 204 may identify the component, reference access permissions associated with the partitioned elements, and raise an exception if the access permissions do not permit the identified component to access the partitioned elements.

It way be noted that the page tables shown and described in embodiments of this invention may be simplified for clarity of discussion. In various embodiments of this invention page tables may include multiple levels of indirection and thousands or even millions of entries. Furthermore, in various embodiments entries at different levels may be identified differently than as identified in discussions herein. For example, on an IA-32 platform, the top level may be referred to as a page directory entry (PDE), while the bottom entry may be referred to as a page table entry (PTE). Extended or Nested Page Tables for protection, remapping, and/or segmentation of guest physical memory may also be used. The intra-partitioning discussed herein may be applied to any of these variations/extensions in accordance with embodiments of this invention.

Further embodiments of intra-partitioning of portions of the component 240 are described in U.S. patent application Ser. No. 11/395,488, filed on Mar. 30, 2006, referenced above.

Figure 5:
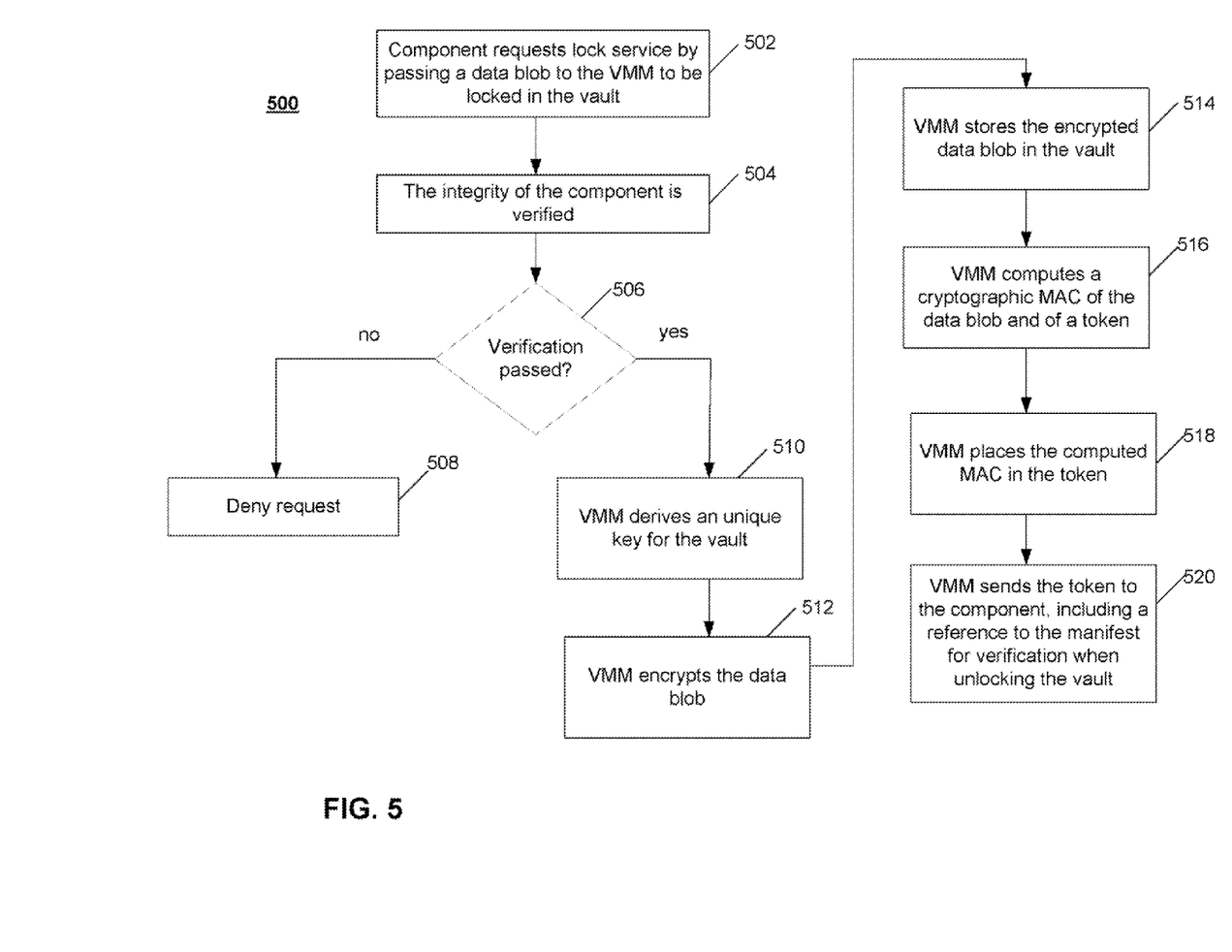
FIG. 5 illustrates operational phases of lock, service, in accordance with an embodiment of the present invention.

Lock service for the secure vault may be provided to the component 240 as described in FIG. 5, in accordance with an embodiment of this invention. Operational phases shown in FIG. 5 may be referenced by numerals within parentheses. Referring to FIG. 5, the component 240 requests lock service by passing a data blob to the VMM 204 to be locked in the vault (or hidden pages) belonging to the PPT of component 240 (block 502). Note that in embodiments, the data could be code too. In embodiments, the component 240 may make the request to the VMM 204 via a hypercall. Once locked in the vault, the data blob will be hidden or not accessible by other software in the platform. In embodiments, the secure vault services module 253 (FIG. 2) of the VMM 204 may be incorporated into the VMM 204 to perform the secure vault services described herein.

The integrity of the component 240 is verified (block 504), as was described above with reference to block 304 of FIG. 3. The ISM 252 may receive a response from IMM 256 reflecting verification of integrity of the active content 248 (block 506). If the verification fails, the ISM 252 denies the request and may trigger an alert (block 508). If the verification passes, the VMM 204 derives a unique key for the vault (block 510). In embodiments, the VMM 204 derives the unique key for the vault from its own key or keys via a one-way cryptographic operation. The VMM 204 can obtain its key from the trusted platform module (TPM) as part of the measured secure boot process that loaded the VMM 204. When the TPM ascertains authenticity and integrity of the loaded VMM 204, the TPM may release its key to the VMM 204. Thus, the basis for trust can be extended from a measured VMM 204 directly to applications or components running one, two or more layers removed even in a non-trusted, unmeasured, or even compromised operating system.

The VMM 204 then encrypts the data blob (block 512). In embodiments, the VMM 204 encrypts the data blob using its own secret key. The VMM 204 then stores or places the encrypted data blob in the vault (block 514).

The VMM 204 computes a cryptographic message authentication code (MAC) of the data blob and of a token (block 516). In embodiments, MAC field in the token is set to all zeros. In embodiments, a data structure may be utilized that maps tokens to components or agents. Here, one token is assigned to each component and the data structure represents a mapping between the token and the data blob key for the particular component. The data blob may also identify the owning component based on the integrity manifest identifier. This information too would be in the computation of the MAC.

The VMM 204 places the computed MAC in the token (518). The VMM 204 then sends the token to the component 240, including a reference to the manifest for verification when unlocking the vault in the future to gain access to the data blob (block 520). The locked content may then be used or stored by the component 240, where the clear text can be inaccessible and may not be modified by the OS or other components.

Figure 6:
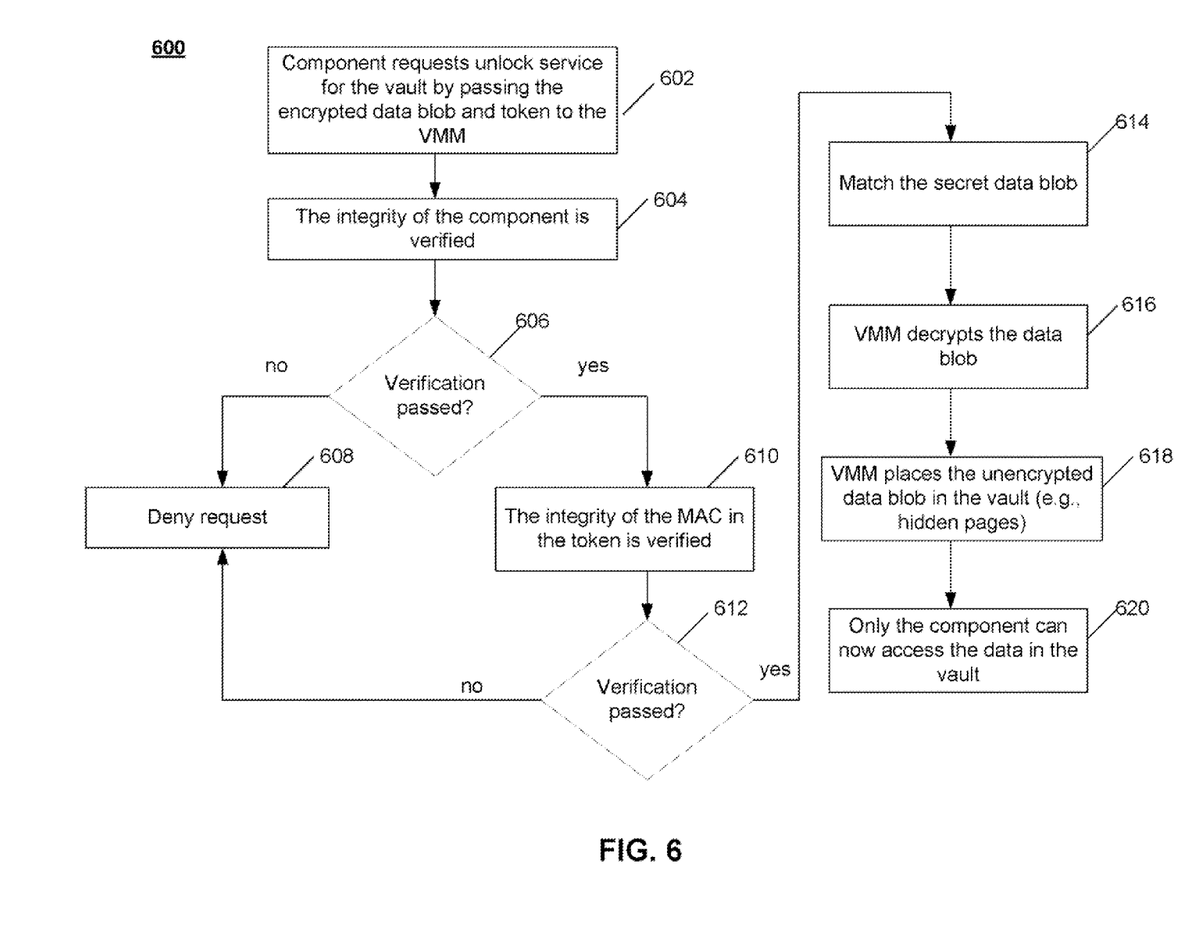
FIG. 6 illustrates operational phases of unlock service, in accordance with an embodiment of the present invention.

Unlock service for the secure vault may be provided to the component 240 as described in FIG. 6 in accordance with an embodiment of this invention. Operational phases shown in FIG. 6 may be referenced by numerals within parentheses. Referring to FIG. 6, the component 240 requests unlock service for the vault by passing the encrypted data blob and token to the VMM 204 (block 602). In embodiments, the component 240 may make the request to the VMM 204 via a hypercall.

The integrity of the component 240 is verified (block 604), as was described above with reference to block 304 of FIG. 3. The ISM 252 may receive a response from IMM 256 reflecting verification of integrity of the active content 248 (block 606). If the verification failed, the ISM 252 denies the request and may trigger an alert (block 608). If the verification passes, the VMM 204 verifies the integrity of the MAC in the token (block 610). Here, the VMM 204 uses its own secret key to prove the token references specified component's manifest (block 612). If the verification fails, the ISM 252 denies the request and may trigger an alert (block 608). If the verification passes, the VMM 204 matches the secret data blob (block 614).

The VMM 204 decrypts the data blob using information in the token and the VMM's secret key (block 616). The VMM 204 places the unencrypted data blob in the vault (block 618). The component 240 can now access the clear text data in the vault (block 620).

In embodiments, a random value or nonce may be part of the encrypted data blob. A nonce is generally not a replay prevention mechanism. Replay protection may be needed if user can back reverse, but may not be required if there is a source of trusted time that can be provided to the component 240 for incorporation in the data blob. Here, in embodiments, the component 240 may be responsible for detecting back reverses and to use the TPM, clock, or remote entity if replay is a concern.

In embodiments, instead of encrypting the data, the token may be used to provide a MAC of the unencrypted data and manifest reference using the VMM 204 secret key to validate the integrity of the information to the component 240 in the future. Here, the same lock and unlock procedure is performed, but the integrity check value is simply calculated on the lock and verified on the unlock operation without encrypting or decrypting the clear text data. In embodiments, for MAC generation, an authenticated encryption mode may be used that both encrypts the data and generates the MAC, or derives a second (authentication key) and applies a function such as a keyed-hashed message authentication code (HMAC) based on SHA256, for example.

Embodiments may also allow content to be locked by one component or set of components yet to be unlocked by another component or set of components. In one embodiment, this is achieved by the locking component identifying to the VMM 204 the destination component that can unlock the data blob via its integrity manifest identifier (or set of identifiers). These identifiers are also integrity protected via the MAC during the lock procedure and verified by the VMM 204 during the unlock procedure to assure that only the targeted destination component(s) may access or modify the content. Such an embodiment may specify both the source and destination integrity manifest identifiers to assure that a protocol may be in place so the destination may determine the component that was source of the locked content was likewise verified by the VMM 204 as the authentic source of the content prior to the data being locked.

Embodiments of the invention may be used for a variety of applications (e.g., security and networking applications) and components (e.g., OS components) to store their secrets at runtime, to make their configuration and secrets secure from attack and to allow these components to reliably attest to the thrust worthiness of the system in the network. In embodiments, applications may utilize the invention to protect keys and configuration information both at runtime and while stored offline so only the properly identified components or agents can access their corresponding secrets. In embodiments, content protection applications can likewise persist their keying material rendering it inaccessible even if the underlying OS is compromised in some fundamental way, and preventing content from being accessed from compromised components. Cryptographic algorithms used for locking and unlocking the data blob may be symmetric, asymmetric or any combination thereof.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
controlling, by an operating system running on a suitably programmed computer, operation of a kernel or application component in a first virtual execution environment;
registering the component at an integrity services module in a management module;
authenticating and verifying the integrity of the component, performed by an integrity measurement module running in a second virtual execution environment;
partitioning off a portion of the component to control access by the operating system to the portion of the component;
allowing the component to request lock or unlock service of the portion of the component, wherein said allowing the component to request lock service of the portion of the component comprises:
passing a data blob to the management module wherein the data blob is to be locked in the portion of the component;
deriving a unique key for the portion of the component, wherein the unique key is derived from a key of the management module;
encrypting the data blob;
storing the encrypted data blob in the portion of the component; and
creating a token to be used by the component to gain access to the encrypted data blob, wherein the token to include a reference to a manifest for verification when unlocking the portion of the component.

2. The method of claim 1, wherein said allowing the component to request unlock service for the portion of the component comprises:
passing the encrypted data blob and token to the management module;
if the integrity of the token can be verified, then decrypting the encrypted data blob; and
storing the decrypted data blob in the portion of the component.

3. The method of claim 2, wherein the data blob includes code.

4. The method of claim 1, wherein the component verifies at least one destination component that may unlock the locked data blob.

5. The method of claim 1, wherein said partitioning off the portion of the component comprises:
creating a protected page table; and
operating the portion of the component from the protected page table to control access by the operating system to the portion of the component.

6. The method of claim 5, further comprising:
operating a portion of the operating system from another page table; and
managing execution flow between the another page table and the protected page table to control access by the operating system to the portion of the component.

7. The method of claim 6, wherein said managing execution flow comprises:
verifying, upon an entry to the protected page table, an entry point and/or an entering execution state.

8. The method of claim 7, further comprising:
recording, upon an exit from the protected page table, an exit point and/or an exiting execution state;
comparing, upon re-entry to the protected page table, the entry point to the recorded exit point and/or the entering execution state to the recorded exiting execution state; and
verifying the entry point and/or the entering execution state based at least in part on said comparing.

9. A non-transitory machine-readable medium containing instructions which, when executed by a processing system, cause the processing system to perform a method, the method comprising:
controlling, by an operating system, operation of a kernel or application component in a first virtual execution environment;
registering the component at an integrity services module in a management module;
authenticating and verifying the integrity of the component, performed by an integrity measurement module running in a second virtual execution environment;
partitioning off a portion of the component to control access by the operating system to the portion of the component;
allowing the component to request lock or unlock service of the portion of the component, wherein said allowing the component to request lock service of the portion of the component comprises:
passing a data blob to the management module wherein the data blob is to be locked in the portion of the component;
deriving a unique key for the portion of the component, wherein the unique key is derived from a key of the management module;
encrypting the data blob;
storing the encrypted data blob in the portion of the component; and
creating a token to be used by the component to gain access to the encrypted data blob, wherein the token to include a reference to a manifest for verification when unlocking the portion of the component.

10. The machine-readable medium of claim 9, wherein said allowing the component to request unlock service for the portion of the component comprises:
passing the encrypted data blob and token to the management module;
if the integrity of the token can be verified, then decrypting the encrypted data blob; and
storing the decrypted data blob in the portion of the component.

11. The machine-readable medium of claim 10, wherein the data blob includes code.

12. The machine-readable medium of claim 9, wherein the component verifies at least one destination component that may unlock the locked data blob.

13. The machine-readable medium of claim 9, wherein said partitioning off the portion of the component comprises:
creating a protected page table; and
operating the portion of the component from the protected page table to control access by the operating system to the portion of the component.

14. The machine-readable medium of claim 13, further comprising:
operating a portion of the operating system from another page table; and
managing execution flow between the another page table and the protected page table to control access by the operating system to the portion of the component.

15. The machine-readable medium of claim 14, wherein said managing execution flow comprises:
verifying, upon an entry to the protected page table, an entry point and/or an entering execution state.

16. The machine-readable medium of claim 15, further comprising:
recording, upon an exit from the protected page table, an exit point and/or an exiting execution state;
comparing, upon re-entry to the protected page table, the entry point to the recorded exit point and/or the entering execution state to the recorded exiting execution state; and
verifying the entry point and/or the entering execution state based at least in part on said comparing.

17. The machine-readable medium of claim 9, wherein the processing system is implemented in a virtual environment.

18. A system comprising:
a processor;
a memory in communication with said processor, said memory storing a plurality of processing instructions for directing said processor, wherein said processing instructions include a kernel or application component configured to be controlled by an operating system to operate within a first virtual execution environment;
a management module configured to register the component at an integrity services module in the management module, to authenticate and verify the integrity of the component using an integrity measurement module running in a second virtual execution environment, and to partition off a portion of the component and to control access by the operating system to the portion of the component;
dynamic random access memory coupled to the management module,
wherein the component is configured to request lock or unlock service of the portion of the component, wherein the component, when requesting lock service of the portion of the component, is further configured to pass a data blob to the management module wherein the data blob is to be locked in the portion of the component, and wherein the management module is further configured to derive a unique key for the portion of the component wherein the key is derived from a key of the management module, to encrypt the data blob, to store the encrypted data blob in the portion of the component, and to create a token to be used by the component to gain access to the encrypted data blob, wherein the token to include a reference to a manifest for verification when unlocking the portion of the component.

19. The system of claim 18, wherein the component, when requesting unlock service of the portion of the component, is further configured to pass the encrypted data blob and token to the management module, and wherein the management module is further configured to determine whether the integrity of the token can be verified, and if so, then to decrypt the encrypted data blob and to store the decrypted data blob in the portion of the component.

20. The system of claim 19, wherein the data blob includes code.

21. The system of claim 18, wherein the component verifies at least one destination component that may unlock the locked data blob.

22. The system of claim 18, wherein to partition off the portion of the component comprises the creation of a protected page table and the operation of the portion of the component from the protected page table to control access by the operating system to the portion of the component.

23. The system of claim 22, wherein the management module is further configured to operate a portion of the operating system from another page table and to manage execution flow between the another page table and the protected page table to control access by the operating system to the portion of the component.

24. The system of claim 23, wherein the management module is further configured to verify, upon an entry to the protected page table, an entry point and/or an entering execution state.

* * * * *